Nov. 28, 1967
H. F. GUTTRIDGE
3,355,040
PIPE TRANSPORTER AND HANDLER
Filed Dec. 10, 1965
5 Sheets-Sheet 5
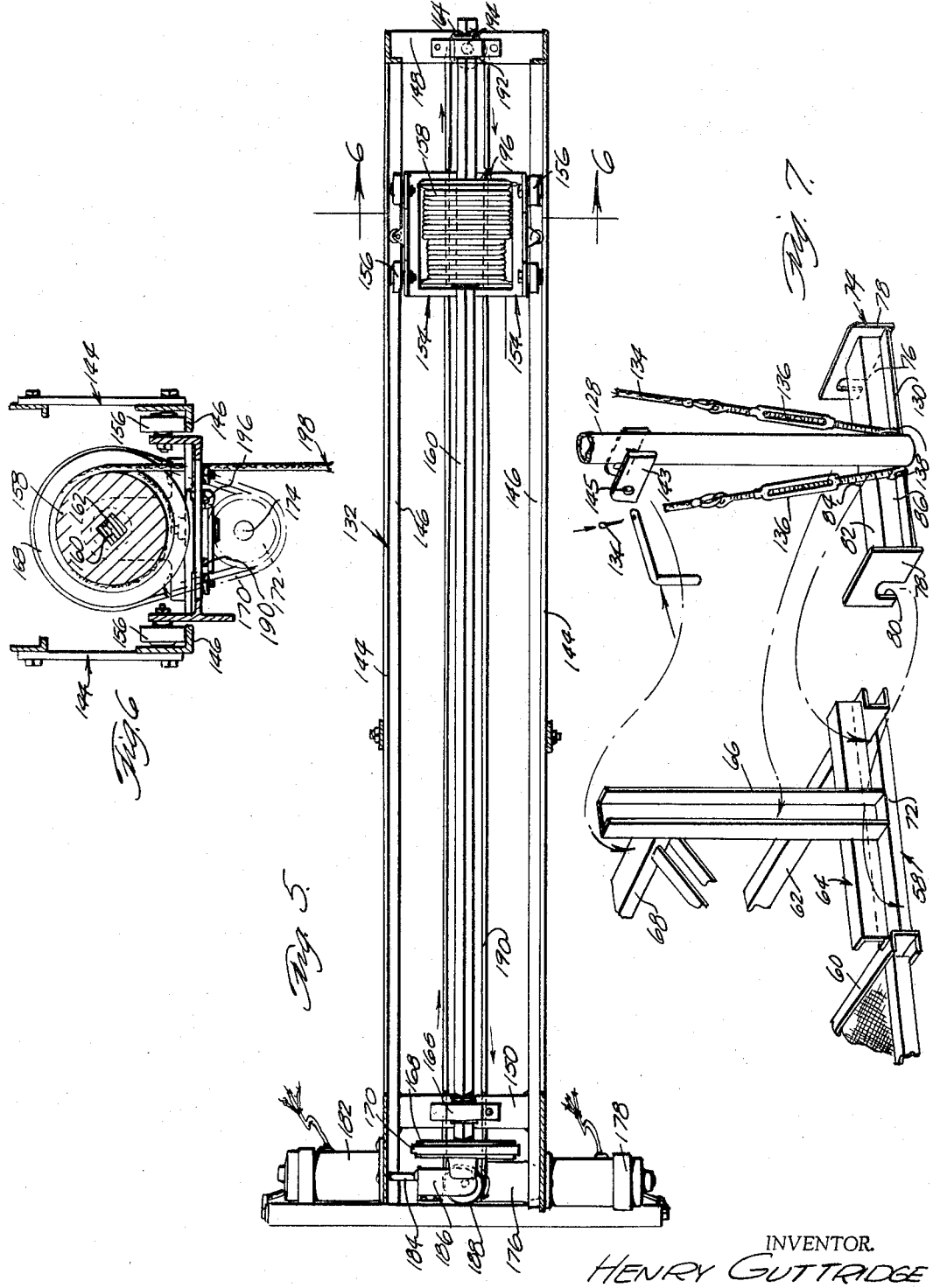
INVENTOR.
HENRY GUTTRIDGE
BY
Berman, Davidson & Berman
ATTORNEYS United States Patent Office
3,355,040
Patented Nov. 28, 1967

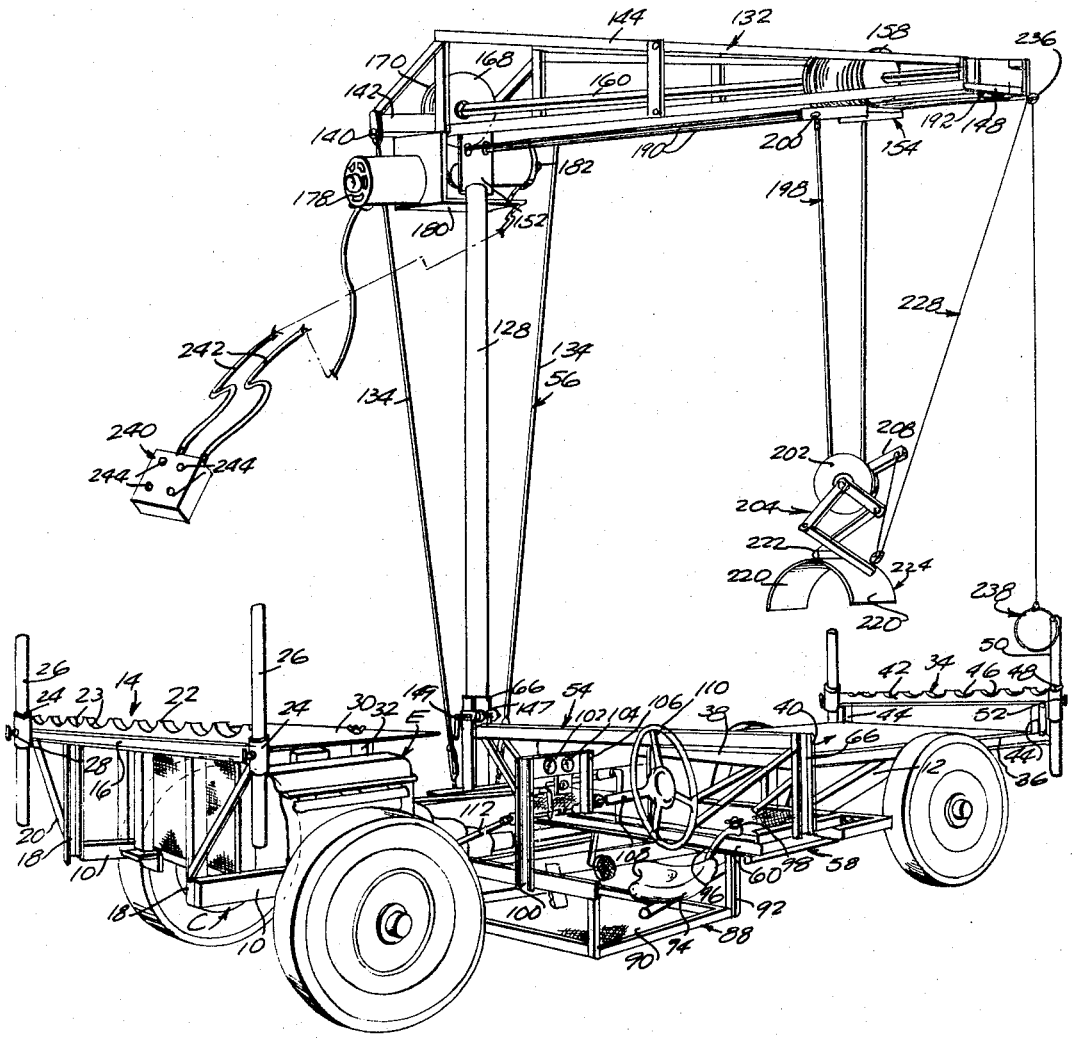

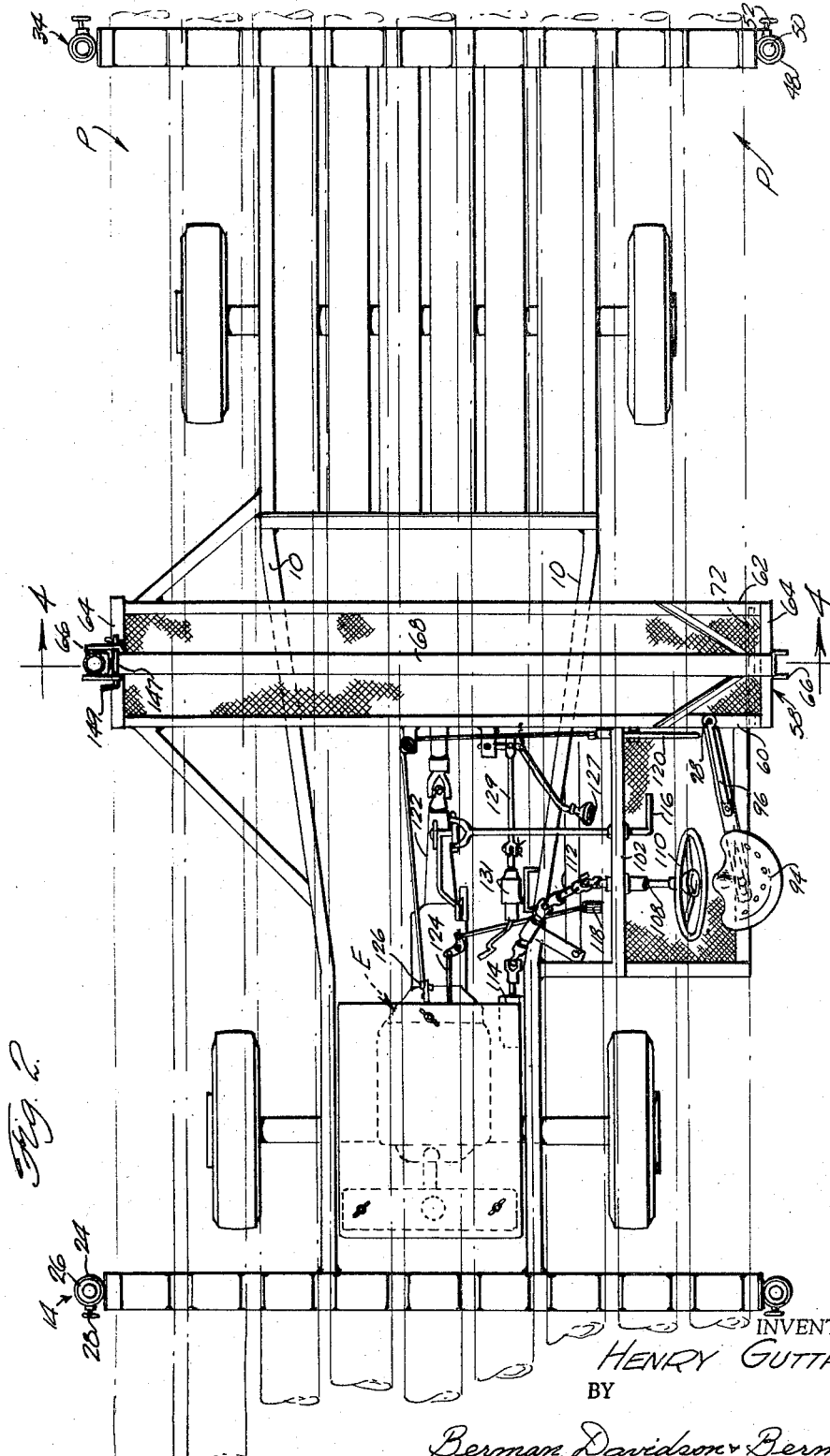

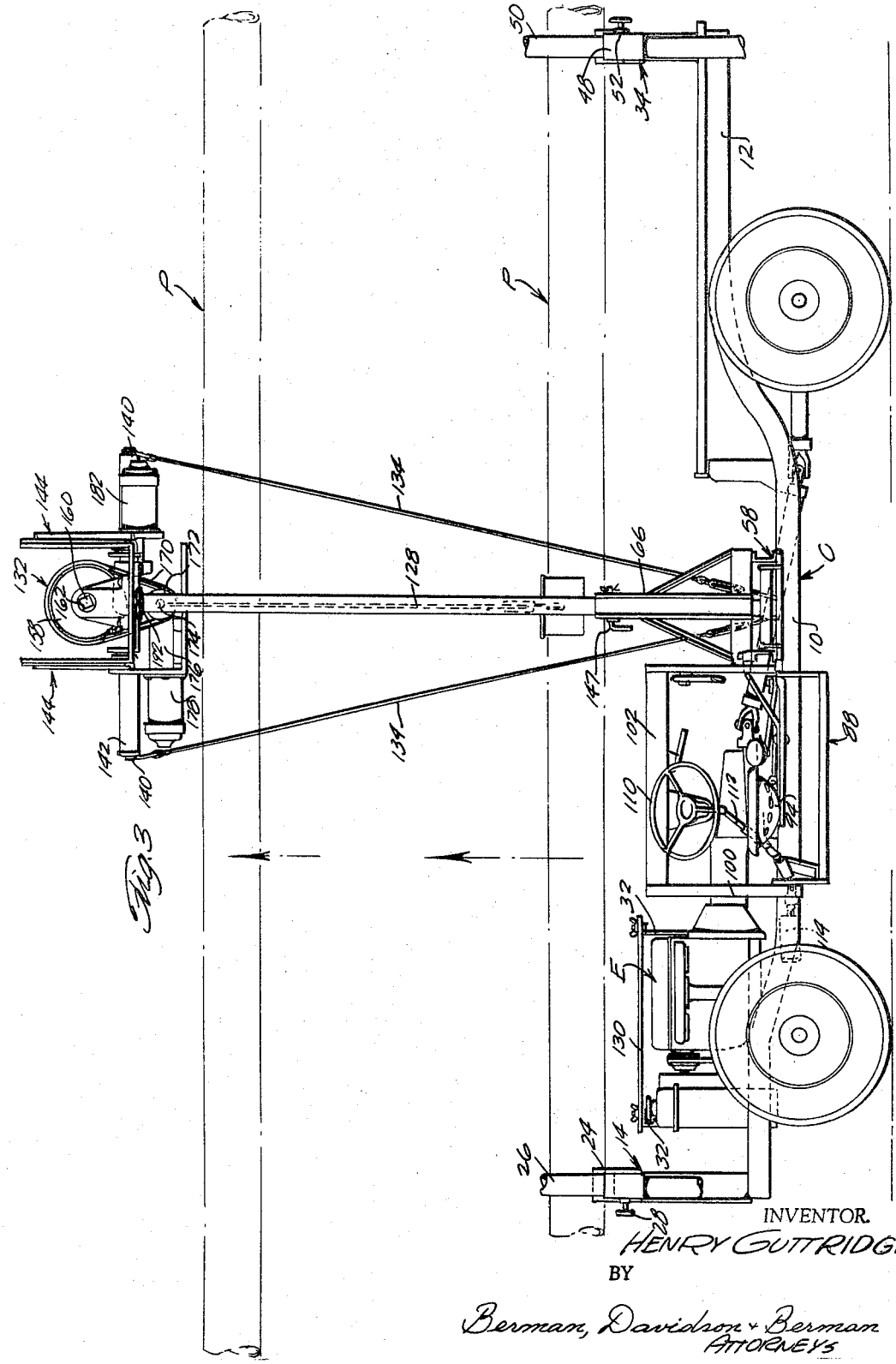

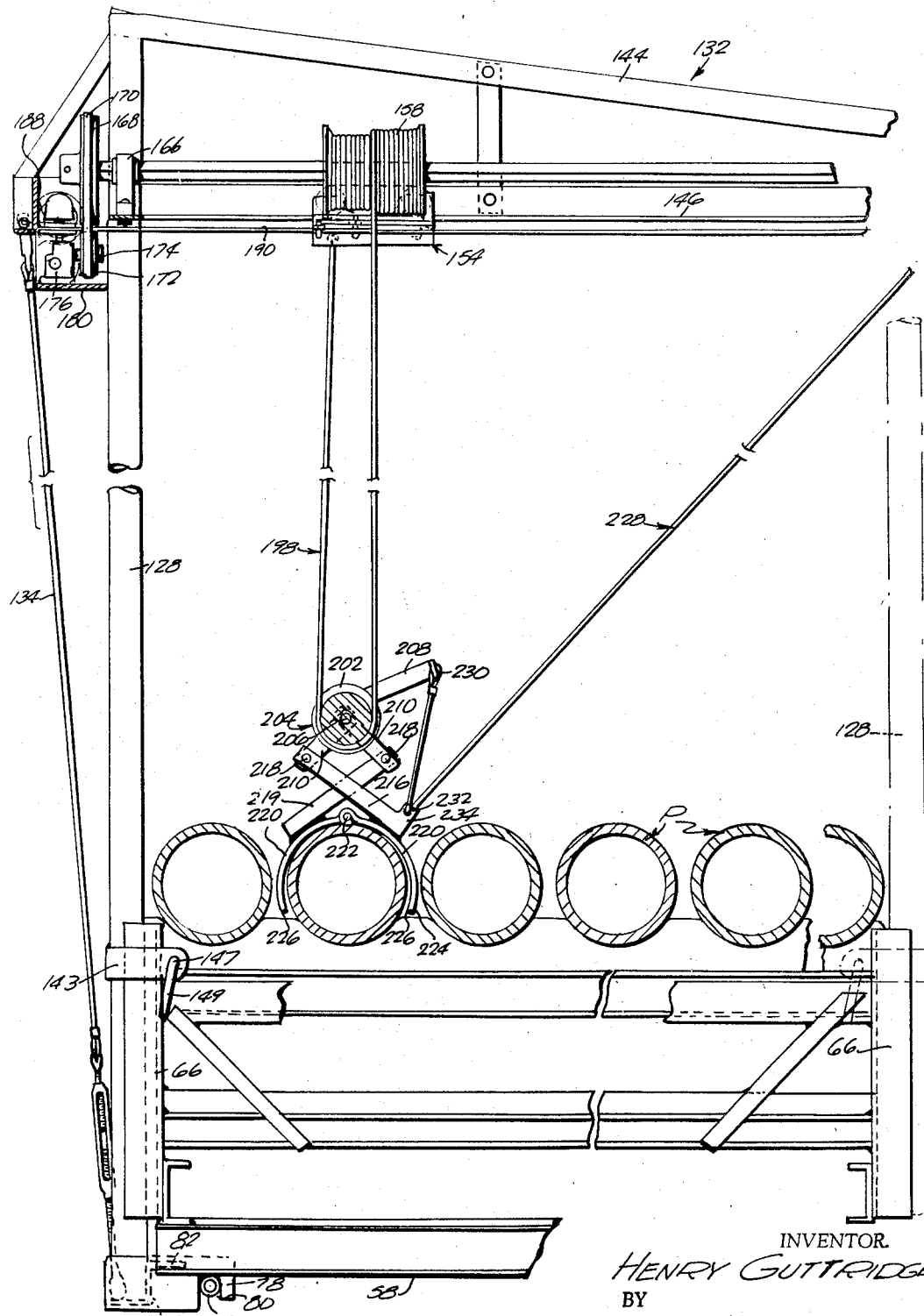

3,355,040
PIPE TRANSPORTER AND HANDLER
Henry F. Guttridge, Rural Rte. 2, Liberal, Kans. 67901
Filed Dec. 10, 1965, Ser. No. 513,009
7 Claims. (Cl. 214—75)

ABSTRACT OF THE DISCLOSURE

A pipe transporter and handler comprising a vehicle; transverse pipe racks at each end of said vehicle; a mast mounted on one side of said vehicle and centrally of the length thereof; a boom affixed to the top of said mast and extending across said vehicle; a winch slidable along said boom; pipe grappling means adapted to be raised and lowered by said winch; reversible means for driving said winch and reversible means for sliding said winch along said boom.

---

This invention relates to devices for transporting and handling elongated objects, and more particularly to a self-propelled unitary device for transporting and handling pipe, such as irrigation pipe, in the field and elsewhere.

The work of picking up, at a supply point, pipe, such as irrigation pipe, transporting the pipe to the site of installation of the pipe, unloading the pipe at the site, and handling the pipe thereat for aligning and connecting pipe lengths, usually involves the provision and operation of a truck or tractor and an accompanying trailer, and the employment of two or more men for the loading, unloading, and pipe handling operations, and operation of the truck or trailer. These provisions involve substantial expenditures of money, time, and labor. Their use also involves loss of cultivation space in a field, as well as damage to growing crops.

The primary object of the invention is the provision of a unitary, compact, self-propelled device, of the kind indicated above, designed for one-man operation, which eliminates or reduces the above-outlined drawbacks.

Another object of the invention is the provision of a device of the character indicated above, which comprises a horizontal, longitudinally elongated frame assembly, adapted to be mounted upon and powered from a pick-up truck or jeep chassis, the said frame assembly having a laterally outwardly extending driver's platform, on which extensions of the motor controls and other controls of the chassis are located, for riding or walking manipulation by the driver, the frame assembly having horizontal pipe-rack means, and pipe lifting and moving means on the frame assembly, for loading and unloading pipe from the rack means, and for manipulating unloaded pipe lengths relative to other pipe lengths, such as pipe lengths already in place at the installation site.

In the drawings:

FIGURE 1 is a front perspective view of a device of the invention, showing the pipe clamp assembly in an elevated position, and the clamp assembly manipulating control box of the device diagrammatically related thereto;

FIGURE 2 is an enlarged top plan view of the device, partly broken away and in section, pipes, in phantom lines, being shown in place on the device;

FIGURE 3 is a side elevation of FIGURE 2;

FIGURE 4 is a further enlarged and fragmentary vertical transverse section, taken on the line 4—4 of FIGURE 2;

FIGURE 5 is an enlarged top plan view, partly broken away and in section;

FIGURE 6 is a vertical transverse section, taken on the line 6—6 of FIGURE 5; and, FIGURE 7 is a fragmentary exploded perspective view, showing selective mounting of a mast support on either side of the frame assembly of the device.

Referring in detail to the drawings, a self-propelled wheeled vehicle chassis C, is shown, such as a pick-up truck or jeep chassis, having spaced longitudinal side members 10, on and between the foreparts of which is mounted an internal combustion engine E, having the usual steering, clutch, brake, and throttle controls, accessible from behind the engine. The chassis side members 10, as herein shown, have kicked-up rear end portions 12.

The frame assembly used to convert the chassis C to the present purposes, includes a front pipe rack 14, comprising a horizontal cross member 16, fixed relative to and spaced upwardly from the forward end portions of the chassis side members 10, on a level above the engine E, as by means of standards 18, fixed to and rising from the members 10, with diagonal braces 20 extending upwardly and outwardly from the lower parts of the standards 18, to outer end portions of the cross member 16, outwardly of the standards. Suitably and fixedly mounted on and extending along the cross member 16 is a front rack bar 22, formed in its upper edge with equally spaced arcuate pipe seating notches 23. The ends of the cross member 16 have vertical sleeves 24 fixed thereon, through which slide adjustable vertical pipe retaining bars 26, held in place, in the sleeves, as by means of set screws 28. The bars 26 serve to retain, on the rack bar 22, layers of pipe imposed upon and rising above the bottom layer of pipe imposed on the rack bar 22. A horizontal utility platform plate 30 extends rearwardly from the rack bar 22, over the engine E, and is supported, on props 32, rising from the chassis C.

A rear pipe rack 34 is mounted upon and extends between the kicked-up rear end portions 12 of the chassis side members 10, and comprises horizontal longitudinal side bars 36, fixed to the portions 12, and connected together, at their forward ends, by a cross bar 38. A horizontal utility platform 40 extends along and between and is fixed to the bars 36 and 38. A horizontal transverse rear rack bar 42 extends across and laterally beyond the rear ends of the side bars 36, and is fixedly supported thereabove, on short vertical bars 44. The rear rack bar 42 is formed, in its upper edge, with pipe seating notches 46, aligned with the corresponding notches of the front rack bar 22. Vertical sleeves 48, fixed on the ends of the rear rack bar 42, accommodate vertically adjustable retaining bars 50, held in place by set screws 52. The front and rear rack bars are on the same horizontal level.

Mounted on the vehicle chassis frame side members 10, between the front and rear pipe racks, is an intermediate framework 54, which provides accommodation for the driver of the vehicle, and the extended driver operated controls for the vehicle, and serves as a support for a pipe handler assembly 56.

The intermediate framework 54 comprises a horizontal rectangular, transversely elongated frame 58, which is suitably fixed to and supportably overlies, and extends beyond opposite sides of the vehicle chassis side members 10, the frame 58 being the immediate support for the pipe handler assembly 56. The frame 58 has parallel spaced front and rear members 60, 62, and outer end members 64 extending between the outer ends of the members 60, 62.

As shown in FIGURE 7, outwardly facing channel uprights 66 are fixed to the outer sides of the end members 64, and a transverse brace bar 68 extends between and is fixed to upper portions of the uprights 66, bracing 70 to other portions of the framework 54 being provided for the frame bar 68. Horizontal longitudinal rods 72, spacedly underlie the rod members 64 and extend between and fixed to the members 60, 62, at locations spaced inwardly from the end members 64.

The end members 64 and the rods 72 serve to removably support, on either end of the frame 58, a mast bracket 74 of the pipe handler assembly 56. The bracket 74 comprises a horizontal longitudinal angle-iron bar 76, shorter than the distance between the frame members 60, 62, with vertical plates 78 fixed on its ends and formed, in their lower edges, with notches 80, adapted to be supportably engaged over the rod 72, with the bar 76 engaged over the related end member 64. The angle-iron bar 76 has a horizontal flange 82 which is notched, as indicated at 84, to receive the upright 66, and a pendant vertical flange 86. The horizontal flange 82 is adapted to bear upon the end member 64, of the frame 58, with the pendant flange 86 engaged with the outer side of the end member 64, as shown in FIGURE 4, whereby the bracket 74 is stabilized in place.

The intermediate framework 54 further comprises a rectangular horizontal driver's frame 88, fixed to and extending laterally outwardly from the left-hand one of the vehicle chassis side members 10, at a location between the front pipe rack 14 and the frame 58, the frame 88 being disposed at a level spaced below the frame 58, and being bridged by a driver's floor 90. The frame 88 is supportably braced, relative to the frame 58, as indicated at 92. A driver's seat 94 is mounted on the free end of a swing arm 96, which is pivotally supported, at its other end, as indicated at 98, on the front member 60, of the frame 58, at the outer end thereof. This arrangement provides for moving the seat 94 out of the way, when desired.

Supported above the floor frame 88, by means indicated at 100, is a longitudinal instrument panel 102, on which are located instrument panel instruments 104, corresponding to and suitably operatively connected to those normally present on the instrument panel of the vehicle chassis C, so as to be readily visible by the driver of the present device, from the seat 94, or from a walking position alongside of the device.

Supported, as indicated at 106, from the instrument panel 102, is a steering post 108, carrying a steering wheel 10, on its outer end, the post 108 being suitably operatively connected, as indicated at 112, to the vehicle's steering gear box 114. Similarly available to the driver are controls 116, 118, and 120, suitably operatively connected to the gear shift mechanism 122, the engine throttle mechanism 124, and the clutch mechanism 126, respectively, of the chassis C. An extension brake pedal 127 is operatively connected, as indicated at 129, to the master cylinder 131 of the chassis.

The pipe handler assembly 56 comprises, besides the bracket 74, a perfectly tubular mast 128, which is centrally and suitably fixed, at its lower end, upon a lateral flange 130, on the outer side of the bar 76 of the bracket 74, and against the outer side of the bracket bar 76. The mast 128 rises to a substantial height above the framework 54 and the pipe racks, and has fixed on its upper end and extending laterally therefrom, a horizontal boom 132. The boom 132 is long enough to reach across and for some distance beyond the side of the vehicle remote from that on which the mast 128 is mounted.

Upwardly diverging guy cables 134, with turnbuckles 136 incorporated therein, are fixed, at their lower ends, as indicated at 138, to the bracket flange 130, at opposite sides of the mast 128, and are fixed, at their upper ends, as indicated at 140, to related ends of a horizontal cross bar 142, on the inner end of the boom 132. The overhang and the weight of the boom 132 holds the bracket 74 and mast 128 in place, with the mast 128 seated in the related channel upright. Parallel spaced horizontal lugs 43, fixed to opposite sides of the mast 128, on a level below the upper end of the related channel upright 66, are provided to engage opposite sides of the upright 66, the lugs 143 being formed with aligned openings 145, at their outer ends, through which a clamping bolt 147 is threaded. The bolt 147 is provided on one end thereof with a lateral handle 149, and is adapted to be tightened, while engaged behind the upright 66, to clamp the lugs 143 against the sides of the upright, whereby positive locking of the mast 128, relative to the related upright 66 is provided.

The boom 123 can comprise open-work parallel spaced side members 144, having laterally inwardly extending horizontal flanges 146 extending therealong and serving as tracks. The side members 144, at their outer ends, are spaced and connected by an outer cross member 148, and adjacent to their inner ends, by an inner cross member 150. Suitable structural means 152, mounts the boom 132, at its inner end, on the mast 128.

A carriage 154 has pairs of longitudinally spaced lateral rollers 156, rolling upon the tracks 146, the carriage 154 having suitably journalled thereon a longitudinally disposed cable drum 158. A horizontal longitudinal polygonal shaft 160 is slidably and non-rotatably engaged through a polygonal bore 162 of the drum 158. The polygonal shaft 160 is suitably journalled, at its outer end, as indicated at 164, on the outer cross member 148 of the boom, and, adjacent to its inner end, at 166, on the inner cross member 150 of the boom.

A pulley wheel 168 is fixed on the inner end of the polygonal shaft 160, at a location inwardly of the inner boom cross member 150, and has a belt 170 trained thereover. As indicated in FIGURES 3, 4, and 6, the belt 170 is also trained under a reduced diameter pulley 172, fixed on the shaft 174 of a speed-reducing assembly 176, which is driven by a first or drum operating electric motor 178. The motor 178 and the assembly 176 are supported on the mast, as indicated at 180. Another electric motor 182, similarly supported, on a level above the motor 178, has an inwardly extending shaft 184 which, at its inner end, is operatively connected, as indicated at 186, to a vertical axis drive pulley 188. An endless belt 190 is trained around the drive pulley 188 and extends outwardly along the boom 132, and is trained, at its outer end, around a vertical axis idler pulley 192, which is supportably journalled, as indicated at 194, on the outer cross member 148 of the boom 132. One flight of the belt 190 is secured, as indicated at 196, to the cable drum carriage 154.

On the cable drum 158 is wound and secured, one end of a lifting cable 198, whose other end is secured, as indicated at 200, to the side of the carriage 154, remote from that at which the cable comes off the drum 158. The cable 198 is trained under a sheave 202, which is a component of a pipe lifting clamp assembly 204.

The clamp assembly 204 comprises a shaft 206, on which the sheave 202 is journalled, a lever 208 being fixed, at its inner end, to one end of the shaft 206 and extending laterally and upwardly therefrom. On the other end of the shaft 206, the upper ends of a pair of downwardly divergent upper links 210 are journalled, and a pair of crossed lower links 214 and 216 are severally pivoted, as indicated at 218, at their upper ends, to the lower ends of the upper links 210. A pair of similar flat arcuate sections 220 are hinged together, as indicated at 222, and extend outwardly and downwardly, relative to each other, and define a pipe clamp 224. The lower link 214 is suitably fixed, at its lower end, to one of the clamp sections 220, and the other lower link 216 is suitably fixed, at its lower end, to the other clamp section 220, the lower links being tangentially disposed relative to the clamp sections. With the foregoing arrangement, upward pull on the cable 198 serves to elevate the sheave 202 and its shaft 206, so that the upper and lower links work, relative to the shaft 206, and relative to each other, and move the clamp sections 220 toward each other, so as to clamp them against opposite sides of a pipe P. As shown in FIGURE 4, the clamp sections 220, when closed, have lower edges 226 which engage the sides of the pipe P at locations below the centerline of the pipe, so that a secure grip is obtained on the pipe.

For releasing the clamp 224, a releasing rope 228 is secured, at one end thereof, as indicated at 230, to the outer end of the lever 208, and is extended downwardly therefrom and passed through an opening 232, in an upstanding ear 234, on the outer end of the lower link 216, then is brought upwardly and passed through an eye 236, on the outer end of the boom 132. The cord 228 has a pendant free end, provided with a hand ring 238. A downward pull on the hand ring 238 serves to pull the lower link 216 upwardly and away from the lower link 214, and the clamped pipe P, so that the clamp sections are spread away from and release the pipe.

A suitable source (not shown) of electricity, either vehicle borne, or otherwise, is suitably connected to the electric motors 178 and 182, and these motors are severally controlled from a movable control box 240, connected by means of shielded flexible cables 242 to the motors, and to solenoid operated reversing switches severally connected in circuit with the motors 178 and 182, respectively.

The control box 240 is equipped with operating buttons 244, accessible from the exterior thereof, and individually connected in circuit with the related reversing switches and motors.

In operation, related control box buttons 244 are operated to operate the motor 182, for moving the belt 190 so as to move the cable drum carriage 154 outwardly or inwardly, along the boom 132, so as to position the pipe clamp 224 in alignment with the particular pipe P, lying on and extending between the pipe racks 14 and 34. Other control box buttons 244 are then operated to energize the motor 178, so as to rotate the polygonal shaft 160, in a direction to rotate the cable drum 158 for winding or unwinding off the lift cable 198, so as to position the pipe clamp 224 relative to the pipe to be lifted, or to lift a pipe clamped in the clamp 224 off the pipe racks, or from a supply site.

The pipe clamp 224 is adapted to be operated and positioned, relative to the boom 132, for lifting pipe off the ground, a truck, or other supply site, and depositing the pipe in different notches of the pipe racks 14 and 34. Thereafter, the pipe clamp 224 is adapted to be operated and positioned to lift pipe off the racks and move the pipe endwise to the site of installation. In this latter operation, the male end of a pipe section can be readily engaged in and started into the female end of an already installed pipe section, by the one-man operator of the device, without requiring the assistance of another man or men.

In the claims:

1. A device of the character described, comprising a wheeled self-propelled vehicle having a chassis, horizontal pipe rack means mounted on the chassis, a pipe handling assembly mounted on the chassis, and one-man operated means on the chassis for driving the vehicle, and one-man operated means for operating the pipe handling assembly, said pipe handling assembly comprising an upstanding mast having a lateral horizontal boom extending laterally therefrom and spaced upwardly from the chassis, a carriage supported on the boom to move along the boom, a cable drum journalled on the carriage and having a lifting cable having one end thereof wound on the drum and the other end thereof secured to the carriage, a pipe clamp assembly having a sheave around which the lifting cable is trained, said operating means comprising reversible electric motor means mounted on the mask, said motor means having components severally operatively connected to the carriage for moving the carriage in opposite directions along the boom and for rotating the cable drum in opposite directions, said operating means further comprising a control box operatively connected to the motor means and accessible from the chassis.

2. A device of the character described, comprising a wheeled self-propelled vehicle having a chassis, horizontal pipe rack means mounted on the chassis, a pipe handling assembly mounted on the chassis, and one-man operated means on the chassis for driving the vehicle, and one-man operated means for operating the pipe handling assembly, said pipe rack means comprising a front pipe rack and a rear pipe rack, a transverse frame fixed on the chassis between the front and rear pipe racks, said transverse frame having longitudinal end members at the sides of the chassis, said pipe handling means comprising an upstanding mast having a bracket on its lower end adapted to be removably interengaged with either of the end members of the transverse frame, said end members having outwardly facing channel uprights fixed thereon into which the mast is adapted to engage, and clamping means comprising lug means on the mast adapted to engage opposite sides of an upright, and a clamping bolt traversing the lug means and engaged with the inner side of a related upright.

3. A device of the character described, comprising a wheeled self-propelled vehicle having a chassis, horizontal pipe rack means mounted on the chassis, a pipe handling assembly mounted on the chassis, and one-man operated means on the chassis for driving the vehicle, and one-man operated means for operating the pipe handling assembly, said pipe handling assembly comprising an upstanding mast having a lateral horizontal boom extending laterally therefrom and spaced upwardly from the chassis, a carriage supported on the boom to move along the boom, a cable drum journalled on the carriage and having a lifting cable having one end thereof wound on the drum and the other end thereof secured to the carriage, a pipe clamp assembly having a sheave around which the lifting cable is trained, said operating means comprising reversible electric motor means mounted on the mast, said motor means having components severally operatively connected to the carriage for moving the carriage in opposite directions along the boom and for rotating the cable drum in opposite directions, said operating means further comprising a control box operatively connected to the motor means and accessible from the chassis, said pipe clamp assembly comprising a pair of opposed arcuate sections hinged together to move toward and away from each other relative to a pipe located therebetween, a shaft on which said sheave is journalled, and linkage extending between and journalled on the shaft and on the clamp sections, said linkage serving to close the clamp sections toward each other as the lifting cable is elevated.

4. A device of the character described, comprising a wheeled self-propelled vehicle having a chassis, horizontal pipe rack means mounted on the chassis, a pipe handling assembly mounted on the chassis, and one-man operated means on the chassis for driving the vehicle, and one-man operated means for operating the pipe handling assembly, said pipe handling assembly comprising an upstanding mast having a lateral horizontal boom extending laterally therefrom and spaced upwardly from the chassis, a carriage supported on the boom to move along the boom, a cable drum journalled on the carriage and having a lifting cable having one end thereof wound on the drum and the other end thereof secured to the carriage, a pipe clamp assembly having a sheave around which the lifting cable is trained, said operating means comprising reversible electric motor means mounted on the mast, said motor means having components severally operatively connected to the carriage for moving the carriage in opposite directions along the boom and for rotating the cable drum in opposite directions, said operating means further comprising a control box operatively connected to the motor means and accessible from the chassis, said pipe clamp assembly comprising a pair of opposed arcuate sections hinged together to move toward and away from each other relative to a pipe located therebetween, a shaft on which said sheave is journalled, and linkage extending between and journalled on the shaft and on the clamp sections, said linkage serving to close the clamp sections toward each other as the lifting cable is elevated, a lateral lever fixed to said shaft, and a clamp releasing rope having one end secured to said lever and a free end provided with a hand-hold, an intermediate part of said rope being operatively engaged with a part of said linkage and being slidably supported on the boom, the hand-hold being adapted to be pulled downwardly to operate the linkage and said lever to spread the clamp sections away from each other.

5. A device of the character described, comprising a wheeled self-propelled vehicle having a chassis, horizontal pipe rack means mounted on the chassis, a pipe handling assembly, said pipe handling assembly comprising operated means on the chassis for driving the vehicle, and one-man operated means for operating the pipe handling assembly, said pipe handling assembly comprising an upstanding mast having a lateral horizontal boom extending laterally therefrom and spaced upwardly from the chassis, a carriage supported on the boom to move along the boom, a cable drum journalled on the carriage and having a lifting cable having one end thereof wound on the drum and the other end thereof secured to the carriage, a pipe clamp assembly having a sheave around which the lifting cable is trained, said operating means comprising reversible electric motor means mounted on the mast, said motor means having components severally operatively connected to the carriage for moving the carriage in opposite directions along the boom and for rotating the cable drum in opposite directions, said operating means further comprising a control box operatively connected to the motor means and accessible from the chassis, said motor means comprising a first electric motor, a horizontal polygonal shaft journalled on and extending along the boom, said cable drum having a polygonal bar slidably receiving the polygonal shaft, and means operatively connecting said first motor to said polygonal shaft, said motor means comprising a second electric motor, an endless belt extending along the boom, an idler pulley on the boom at the outer end thereof over which the belt is trained, a drive pulley on the beam at the inner end thereof over which the belt is trained, a flight of said belt being secured to the carriage, and means operatively connecting the second motor to said drive pulley.

6. A pipe transporter and handler comprising a vehicle; transverse pipe racks at each end of said vehicle; a mast mounted on one side of said vehicle and centrally of the length thereof; a boom affixed to the top of said mast and extending across said vehicle; a winch slidable along said boom; pipe grappling means adapted to be raised and lowered by said winch; reversible means for driving said winch and reversible means for sliding said winch along said boom.

7. A device as set forth in claim 6, in which said mast, boom, winch and reversible means are transferable as a unit from one side of the vehicle to the other.

References Cited
UNITED STATES PATENTS

| | | |
|---|---|---|
| 858,533 | 7/1907 | Peterson. |
| 1,966,240 | 7/1934 | Erdahl _____ 294—118 |
| 2,763,383 | 9/1956 | McCoy _____ 214—75 |
| 2,867,341 | 1/1959 | Tieslau _____ 214—75 |
| 3,282,450 | 11/1966 | Atcheson _____ 214—75 |

ROBERT G. SHERIDAN, *Primary Examiner.*